(12) United States Patent
Miller (10) Patent No.: US 6,796,472 B2
(45) Date of Patent: Sep. 28, 2004

(54) AUTOMOBILE TRUNK COMPARTMENTALIZER

(76) Inventor: William C. Miller, 2407 Oak Hill Dr., Copperas Cove, TX (US) 76522

( * ) Notice: Subject to any disclaimer, the term of this patent is extended or adjusted under 35 U.S.C. 154(b) by 0 days.

(21) Appl. No.: 10/021,649

(22) Filed: Dec. 19, 2001

(65) Prior Publication Data
US 2003/0111503 A1 Jun. 19, 2003

(51) Int. Cl.⁷ .................................................. B60R 7/00
(52) U.S. Cl. ........................ 224/539; 224/550; 224/555; 224/566; 224/925
(58) Field of Search ........................... 224/539, 542, 224/550, 555, 566, 548, 549, 556, 565, 403, 404, 925; 220/4.33, 4.34, 4.27, 4.31, 533; 296/37.1, 37.6; 410/129, 142; 70/34, 395, 397, 398, 404, 454

(56) References Cited

U.S. PATENT DOCUMENTS

| | | | |
|---|---|---|---|
| 4,718,584 A | | 1/1988 | Schoeny |
| 5,215,205 A | | 6/1993 | Behlman |
| 5,289,941 A | * | 3/1994 | Blankenburg et al. ...... 220/552 |
| 5,518,170 A | | 5/1996 | Rasmussen |
| 5,520,316 A | | 5/1996 | Chen |
| 5,526,972 A | | 6/1996 | Frazier |
| 5,662,305 A | | 9/1997 | Shimamura |
| 5,715,978 A | | 2/1998 | Ackeret |
| 6,138,883 A | * | 10/2000 | Jackson et al. ............. 224/404 |
| 6,149,040 A | | 11/2000 | Walker |
| 6,386,006 B1 | * | 5/2002 | DeWalch ...................... 70/34 |

* cited by examiner

Primary Examiner—Stephen K. Cronin
Assistant Examiner—Maerena Brevard
(74) Attorney, Agent, or Firm—Larry Mason Lee (57) ABSTRACT

An automobile trunk compartmentalizer which provides for variable connection of shafts and shaft housings by use of lockable pins whereby great variety of compartment sizes and shapes is possible at the user's option. Creation of more than one row of compartments in the automobile trunk may provide shallow compartments which are desirable for an aging population.

4 Claims, 10 Drawing Sheets

AUTOMOBILE TRUNK COMPARTMENTALIZER

BACKGROUND OF THE INVENTION a. Field of the Invention

The present invention is related generally to apparatus utilized to accomplish a variable division or compartmentalization of an automobile trunk and for securing cargo loaded into such trunk.

Typically apparatus utilized to accomplish a variable division of an automobile trunk are comprised of members of fixed length such that the shape and/or the dimensions of the compartments created by division of an automobile trunk are fixed. This limits usefulness of the created compartments.

All of the known art in the field of apparatus to accomplish a division or compartmentalization of automobile trunks provide for but a single row of compartments between the rear of the trunk area and the rear-most line between the wheel wells of the automobile. This limitation fails to address the difficulty encountered by an aging population in bending and stretching to reach cargo items which are, because of the depth of the compartment, deep within the trunk close to a rear-most line between the wheel wells of the automobile.

More particularly the present invention is related to apparatus which permit compartmentalization of automobile trunks into compartments of variable size and shape.

Yet more particularly the present invention is related to apparatus which permit compartmentalization of automobile trunks which provides for more than one row of compartments between the rear of the trunk and a rear-most line between the wheel wells of the automobile.

Yet more particularly the present invention is related to apparatus which permit compartmentalization of automobile trunks into compartments which provide a variable number of compartments.

In yet further and final point of particularity, the present invention is related to apparatus which permit compartmentalization of automobile trunks into compartments which provide the flexibility to quickly and easily change the configuration of the compartments as the loading of cargo within the trunk space of an automobile is being accomplished.

b. Description of the Prior Art

Various automobile trunk compartmentalizers, or devices and systems useful for such purpose, are known in the prior art. The prior art includes the following devices useful for compartmentalizing an automobile trunk.

U.S. Pat. No. 5,715,978 discloses a device for variable division of a motor vehicle boot and for securing the loaded goods which utilizes a guide rail arranged on the floor of an automobile trunk and one or more support panels guided by a sliding guide block in the guide rail at right angles to the guide rail and so as to be transversely displaceable therein. This patent does not, however, disclose a device or system which provides for variable length of the support panels. Additionally, the support panels of the disclosed invention are confined to a pre-set number of paths which divide the trunk area in a front to back fashion into compartments whereby only one row of compartments is possible.

U.S. Pat. No. 4,718,584 discloses an accessory for use in hatchback automobiles and station wagons that is dimensioned to fit within the rear interior area of the automobile, and is intended to restrict movement of small articles during transportation. The accessory comprises a base, a back flap swingably attached to the base, and at least two side flaps swingably attached to the back flap. The invention disclosed by this patent does not provide for variation in either the number or size of the compartments provided. Additionally, the invention disclosed divides the trunk area in a front to back fashion into compartments whereby only one row of compartments to the rear of a rear-most line between the wheel wells of the automobile is possible.

U.S. Pat. No. 5,215,205 discloses a device for organizing articles which includes a plurality of wall members disconnectably connected together at their ends to form a closed perimeter wall of predetermined configuration. The area bounded by the perimeter wall is subdivided into a plurality of compartments by a primary divider wall and a plurality of subdivider walls wherein the subdivider walls are removable and or repositionable to change the number and size of compartments. The invention disclosed by this patent includes one or more compartments between the wheel wells of the automobile, but provides only for divisions from front to back of the automobile trunk space whereby all compartments are rectangular and no compartment depth is less than the distance between a rear-most line between the wheel wells of the automobile and the rear of the trunk space.

U.S. Pat. No. 6,149,040 discloses a removable vehicle trunk organizer comprising a container with a variable number of separated compartments and a reversible locking device for laterally securing the container within a vehicle trunk. The reversible locking device comprises a spiral throw-out lock with at least one extensible leg linked to an exterior actuator. The invention disclosed by this patent does not provide for variable size compartments, nor does it provide for compartments that are other than rectangular in shape, nor does it provide for more than one row of compartments in the trunk area between the rear of the trunk and the rear-most line between the wheel wells of the automobile.

U.S. Pat. No. 5,526,972 discloses a space organizer including a backboard which extends laterally across the storage area and at least two wing-like partition members which can be either fixed or hinged and which partition a given area of the storage area into three cells or sub-areas for bags and the like. The invention disclosed by this patent does not provide for a storage compartment between the wheel wells, does not provide for more than one row of compartments between the rear of the trunk area and the rear-most line between the wheel wells, and does not provide for more than three compartments.

U.S. Pat. No. 5,520,316 discloses a storage rack for automobile trunks which can be readily installed in a typical automobile trunk, and may be used to secure objects of different sizes, thereby preventing these objects from being damaged during transportation. The storage rack consists of two supporting bars, two bracing bars, and a multiple number of sliding and tightening pieces. The disclosure of this patent provides for multiple, variable sized front to back divisions of the trunk area between the rear of the trunk and the line between the wheel wells. This patent disclosure does not provide for the creation of more than one row of compartments between the rear of the trunk and the rear-most line between the wheel wells, does not provide for a compartment between the wheel wells, and does not provide for non-rectangular compartments.

Accordingly, in the prior art there remains need for an automobile trunk compartmentalizer that provides for more than one row of compartments between the rear of the trunk and a rear-most line between the wheel wells of the automobile, variable sized compartments, variable shaped compartments, a variable number of compartments, one or more compartments between the wheel wells of the automobile, and the flexibility to quickly and easily change the configuration of the compartments as the loading of cargo within the trunk space of an automobile is being accomplished.

SUMMARY OF THE INVENTION

The instant invention is of an automobile trunk compartmentalizer that provides variable size and shape compartments, and thereby provides control of the depth of the compartment, as measured from the rear of the trunk area to the rear-most line between the wheel wells of the automobile.

Accordingly, it is an object of this invention to provide a device or system that compartmentalizes an automobile trunk into compartments that are variable in size.

It is a further object of this invention to provide a device or system that compartmentalizes an automobile trunk into compartments that are variable in shape.

It is a yet further and final object of this invention to provide a device or system that compartmentalizes an automobile trunk into more than one row of compartments between the rear of the trunk and the rear-most line between the wheel wells of the automobile whereby the depth of the compartment is variable and convenient for persons who desire to avoid stooping or stretching when retrieving cargo from the trunk area of their automobile.

Description of Numeric References

| Reference No. | Description |
| --- | --- |
| 1. | interior of automobile trunk |
| 3. | space within automobile trunk between wheel wells |
| 5. | left wheel well area |
| 7. | right wheel well area |
| 9. | boundary between automobile trunk space and automobile |
| 11. | first long shaft housing |
| 13. | second long shaft housing |
| 15. | third long shaft housing |
| 17. | first short shaft housing |
| 19. | second short shaft housing |
| 21. | third short shaft housing |
| 23. | not used |
| 25. | first slideable shaft |
| 27. | second slideable shaft |
| 28. | third slideable shaft |
| 29. | fourth slideable shaft |
| 31. | fifth slideable shaft |
| 33. | slot in top of shaft first long shaft housing |
| 35. | flange on first lockable pin |
| 37. | handle on first lockable pin |
| 38. | first upper slideable shaft connector on first short shaft housing |
| 39. | flange on second lockable pin |
| 41. | first upper slideable shaft connector on third long shaft housing |
| 43. | second upper slideable shaft connector on third long shaft housing |
| 45. | third upper slideable shaft connector on third long shaft housing |
| 47. | second upper slideable shaft connector on first short shaft housing |
| 49. | third upper slideable shaft connector on first short shaft housing |

Description of Numeric References

| Reference No. | Description |
| --- | --- |
| 51. | fourth upper slideable shaft connector on first short shaft housing |
| 53. | sixth slideable shaft |
| 55. | fourth long shaft housing |
| 57. | fifth upper slideable shaft connector on first short shaft housing |
| 59. | not used |
| 61. | keyed aperture in first upper slideable shaft connector |
| 63. | keyed aperture in second upper slideable shaft connector |
| 65. | keyed aperture in third upper slideable shaft connector |
| 67. | keyed aperture in fourth upper slideable shaft connector |
| 69. | flange on third lockable pin |
| 71. | flange on fourth lockable pin |
| 73. | flange on fifth lockable pin |
| 75. | flange on sixth lockable pin |
| 77. | not used |
| 79. | not used |
| 81. | first horizontal support |
| 83. | bottom of horizontal support |
| 85. | hook portion of loop and hook system |
| 87. | upper surface curvature of horizontal support |
| 89. | vertical face of horizontal support |
| 91. | horizontal surface of base of first horizontal support |
| 93. | rear surface of horizontal support |
| 95. | face supporting top surface of horizontal support |
| 97. | left lateral edge of horizontal support |
| 99. | right lateral edge of horizontal support |
| 101. | horizontal surface of base of second horizontal support |
| 103. | handle connection on first lockable pin |
| 105. | first lockable pin |
| 107. | shaft of first lockable pin |
| 109. | first lateral appendage to first lockable pin |
| 111. | second lateral appendage of first lockable pin |
| 113. | spring on first lockable pin |
| 115. | tapered region of first lockable pin |
| 117. | flat end of first lockable pin |
| 119. | first depressible ball in tapered region of first lockable pin |
| 121. | second depressible ball in tapered region of first lockable pin |
| 123. | first keyed aperture in first slideable shaft |
| 125. | second keyed aperture in first slideable shaft |
| 126. | appendage locking area in second keyed aperture in first slideable shaft |
| 127. | key way in second keyed aperture in first slideable shaft |
| 129. | not used |
| 131. | first retaining ring on first long shaft housing |
| 133. | first retaining ring connector on first long shaft housing |
| 135. | eighth upper slideable shaft connector |
| 137. | keyed aperture in eighth upper slideable shaft connector |
| 139. | ninth upper slideable shaft connector |
| 141. | keyed aperture in ninth upper slideable shaft connector |
| 143. | tenth upper slideable shaft connector |
| 145. | keyed aperture in tenth upper slideable shaft connector |
| 147. | second retaining ring on first long shaft housing |
| 149. | second retaining ring connector on first long shaft housing |
| 151. | third retaining ring on first long shaft housing |
| 153. | third retaining ring connector on first long shaft housing |
| 155. | eleventh upper slideable shaft connector |
| 157. | keyed aperture in eleventh upper slideable shaft connector |
| 159. | twelfth upper slideable shaft connector |
| 161. | keyed aperture in twelfth upper slideable shaft connector |
| 163. | thirteenth upper slideable shaft connector |
| 165. | keyed aperture in thirteenth upper slideable shaft connector |
| 167. | fourth retaining ring connector on first long shaft housing |
| 169. | fourth retaining ring on first long shaft housing |
| 171. | left inset portion of first slideable shaft end |
| 173. | groove in first slideable shaft |
| 175. | left tongue in first long shaft housing |
| 177. | right tongue in first long shaft housing |
| 179. | interior surface of first long shaft housing |
| 181. | first lower slideable shaft connector on first long shaft |

-continued

Description of Numeric References

| Reference No. | Description |
|---|---|
| | connector |
| 183. | keyed aperture in first lower slideable shaft connector on first long shaft connector |
| 185. | first lower retaining ring on first long shaft housing |
| 187. | first lower retaining ring connector on first long shaft housing |
| 189. | second lower slideable shaft connector on first long shaft connector |
| 191. | keyed aperture in second lower slideable shaft connector on first long shaft connector |
| 193. | second lower retaining ring on first long shaft housing |
| 195. | second lower retaining ring connector on first long shaft housing |
| 197. | not used |
| 199. | right inset portion of first slideable shaft end |
| 201. | third lower retaining ring on first long shaft housing |
| 203. | third lower retaining ring connector on first long shaft housing |
| 205. | keyed aperture in third lower slideable shaft connector on first long shaft connector |
| 207. | third lower slideable shaft connector on first long shaft connector |
| 209. | keyed aperture in fourth lower slideable shaft connector on first long shaft connector |
| 211. | fourth lower slideable shaft connector on first long shaft connector |
| 213. | cargo |
| 215. | first item of cargo |
| 217. | second item of cargo |
| 219. | first upper retaining ring on third short shaft housing |
| 221. | first upper retaining ring on third long shaft housing |
| 223. | cord |
| 225. | second upper retaining ring on third long shaft housing |
| 227. | first upper retaining ring on second long shaft housing |
| 229. | second upper retaining ring on second long shaft housing |
| 231. | first upper retaining ring on fourth long shaft housing |
| 233. | second upper retaining ring on fourth long shaft housing |
| 235. | second upper retaining ring on third short shaft housing |
| 237. | first lower retaining ring on third long shaft housing |
| 239. | first lower slideable shaft connector on third long shaft housing |
| 241. | second lower slideable shaft connector on third long shaft housing |
| 243. | third lower slideable shaft connector on third long shaft housing |
| 245. | second lower retaining ring on third long shaft housing |
| 247. | first upper slideable shaft connector on third short shaft housing |
| 249. | second upper slideable shaft connector on third short shaft housing |
| 251. | flange on seventh lockable pin |
| 253. | flange on eighth lockable pin |
| 255. | flange on ninth lockable pin |
| 257. | first lower slideable shaft connector on third short shaft housing |
| 259. | second lower slideable shaft connector on third short shaft housing |
| 261. | seventh slideable pin shaft |
| 263. | eighth slideable pin shaft |
| 265. | ninth slideable pin shaft |
| 267. | first depressible ball in tapered region of seventh lockable pin |
| 269. | second depressible ball in tapered region of ninth lockable pin |
| 271. | first lower retaining ring on third short shaft housing |
| 273. | second lower retaining ring on third short shaft housing |
| 275. | handle on seventh lockable pin |
| 277. | handle connection on seventh lockable pin |
| 279. | handle on eighth lockable pin |
| 281. | handle connection on eighth lockable pin |
| 283. | handle on ninth lockable pin |
| 285. | handle connection on ninth lockable pin |

BRIEF DESCRIPTION OF THE DRAWINGS

While the novel features of the instant invention are set forth with particularity in the appended claims, a full and complete understanding of the invention can be had by referring to the detailed description of the preferred embodiment(s) which are set forth subsequently, and which are as illustrated in the accompanying drawings, in which:

DESCRIPTION OF THE PREFERRED EMBODIMENT(S)

As seen in the drawings, the instant invention is comprised of an assemblage of four basic components, in various combinations and in varying numbers as elected by the automobile owner, that may be interconnected in a multitude of ways creating a trunk compartmentalizer. The four basic components are a short shaft housing 17, a long shaft housing 11, a shaft 25, and a lockable pin 105. Additionally, optional horizontal supports 81 may be used.

Figure 1:
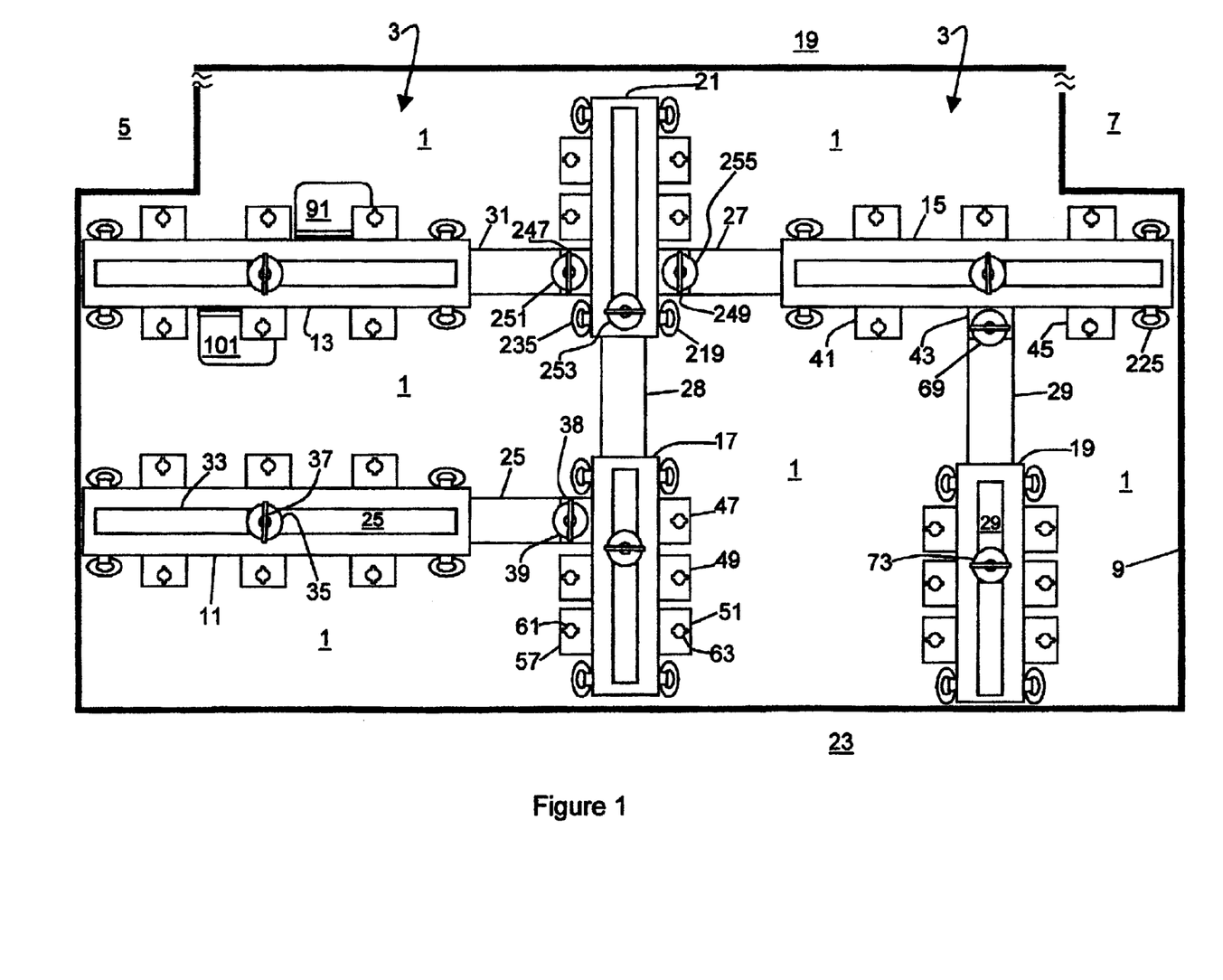
FIG. 1 is a horizontal plane view of trunk area of an automobile with the instant invention installed, depicting horizontal deployment of a long shaft housing to the left of center and vertical deployment of a short shaft housing to the right of center.

FIG. 1 depicts an arrangement of the four basic components within the trunk area 1 of an automobile. The rear of the trunk area 23 is that area closest to the rear of the automobile and the area 3 is that portion of the trunk area 1 between the left wheel well 5 and the right wheel well 7 of the automobile. The arrangement of the four basic components in FIG. 1 utilizes three long shaft housings 11, 13, and 15; three short shaft housings 17, 19, and 21; five slideable shafts 25, 27, 28, 29, and 31; and ten lockable pins which can be seen in the horizontal plane view of FIG. 1 only by the depiction of their flanges and handles. The flanges and handles of the lockable pins are depicted in FIG. 1 as is called out for the flange 35 and handle 37 of the first lockable pin 105.

Figure 2:
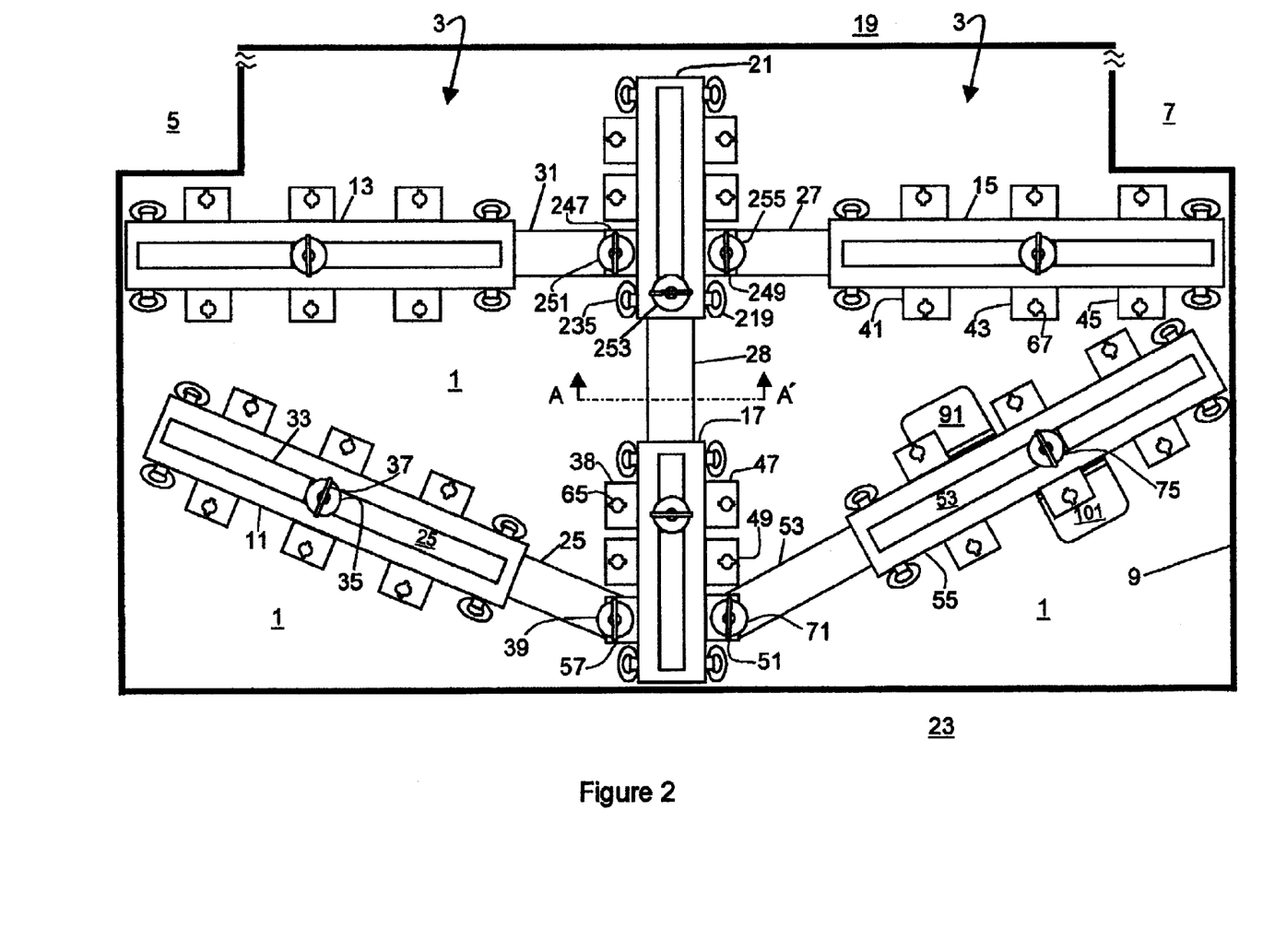
FIG. 2 is a horizontal plane view of trunk area of an automobile with the instant invention installed, depicting a diagonal deployment of a long shaft housing to the left of center and a diagonal deployment of a long shaft housing to the right of center.

As seen in FIG. 1, various arrangements of the four basic components are possible which permit creation of shallow compartments, such as is created by the attachment of the slideable shaft 25 which extends out of the long shaft housing 11 to the upper connection flange 38 of the short shaft housing 17; and deep compartments, such as is created by the attachment of the slideable shaft 29 which extends out of the short shaft housing 19 to the upper connection flange 43 of the long shaft housing 15. Additionally, as seen in FIG. 2, various arrangements of the four basic components are possible which permit creation of non-rectangular compartments, such as is created by the attachment of the slideable shaft 25 which extends out of the long shaft housing 11 to the upper connection flange 57 of the short shaft housing 17; and by the attachment of the slideable shaft 53 which extends out of the long shaft housing 55 to the upper connection flange 51 of the short shaft housing 17.

Figure 8:
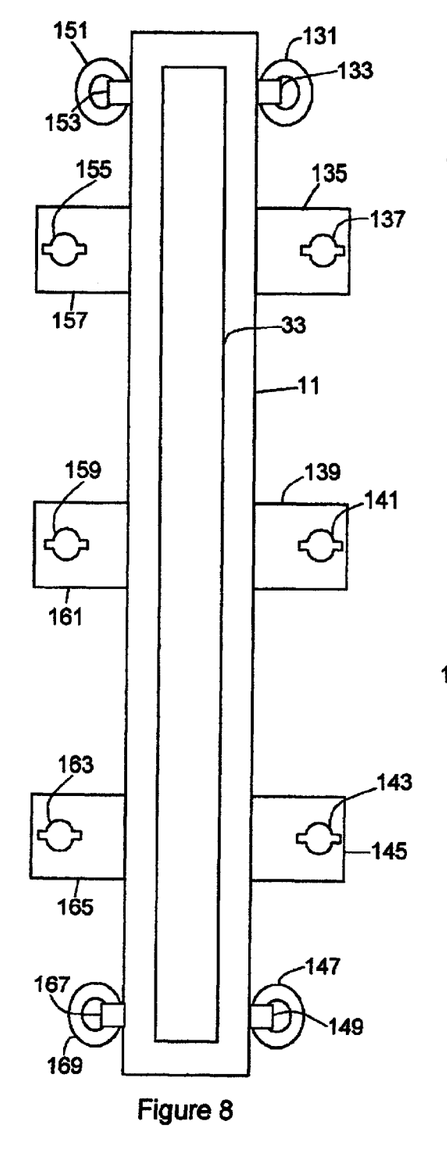
FIG. 8 is a horizontal plane view of the first long shaft housing of the instant invention.
Figure 9:
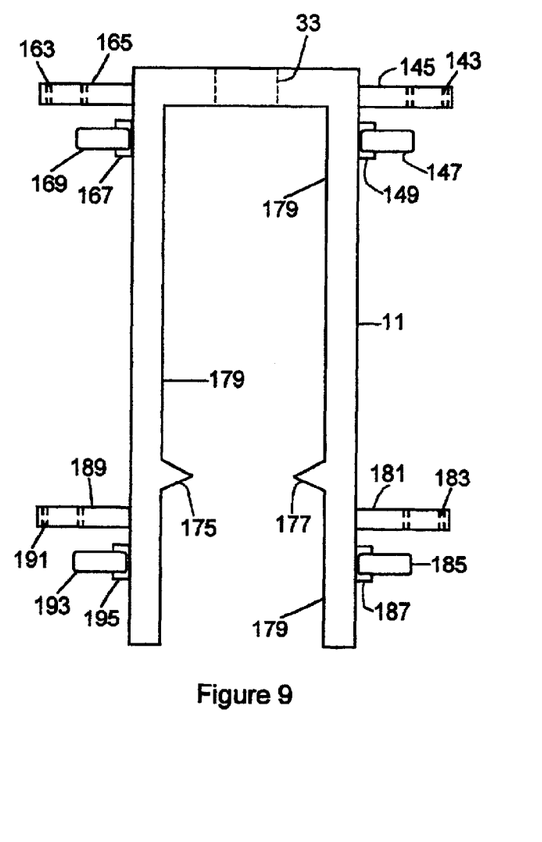
FIG. 9 is a vertical plane view of the first long shaft housing of the instant invention.
Figure 10:
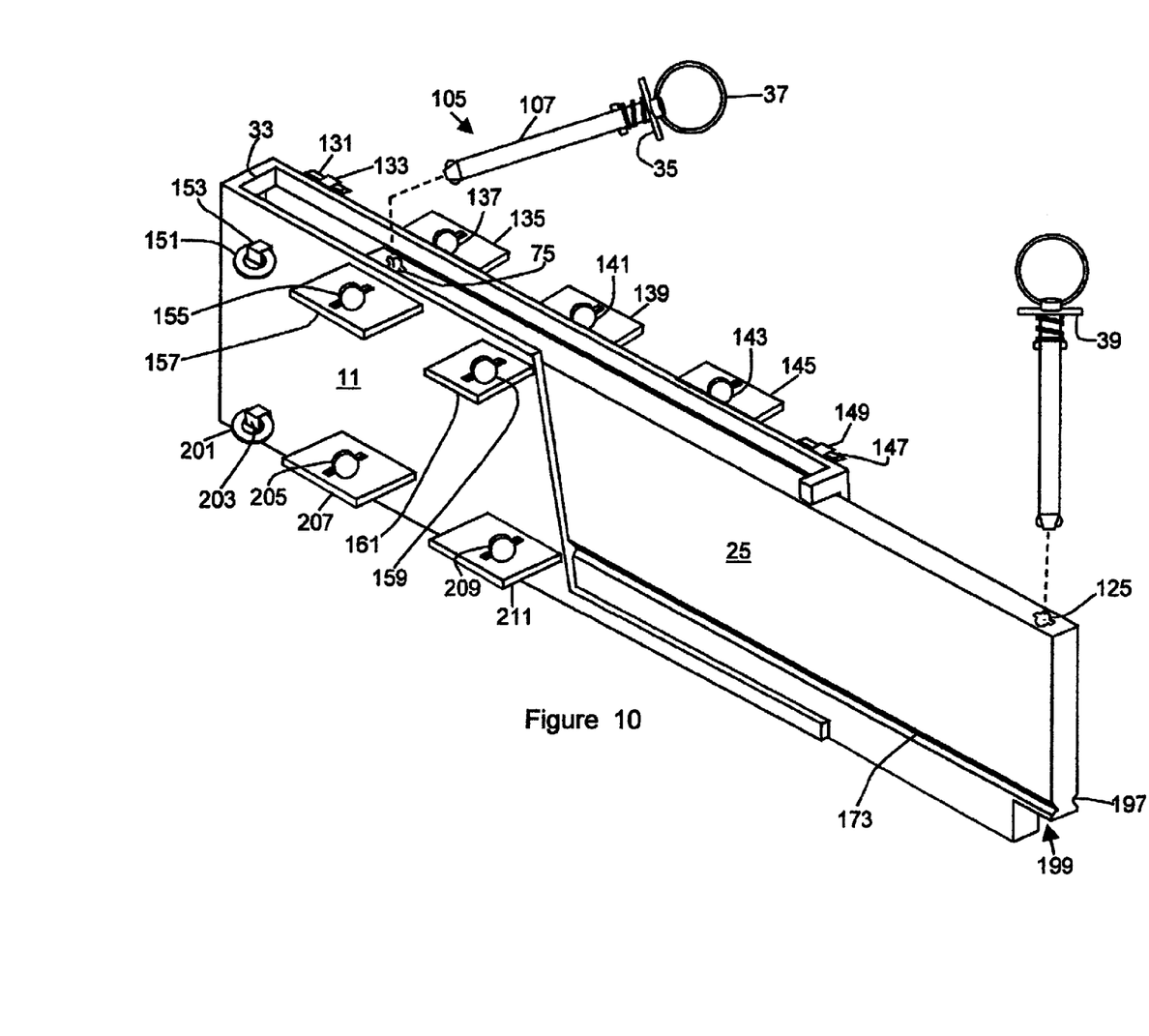
FIG. 10 is a perspective view of the first slideable shaft partially inserted into the first long shaft housing of the instant invention.

The structure of the first and second of the four basic components, long and short shaft housings, is depicted in FIGS. 8 and 9. As seen in FIG. 8 and 9, the long shaft housing 11 is used as an example, all long and short shaft housings being constructed similarly. FIG. 8 depicts the long shaft housing 11 with a rectangular body, having a slot 33 in its upper surface, having lateral upper connection flanges 135, 139, 143, 155, 159, and 163 along its length, and having retaining rings 131, 147, 151, and 169 connected by retaining ring connectors 133, 149, 153, and 167, respectively, located at the end of each of its long sides. Each of the lateral upper connection flanges 135, 139, 143, 155, 159, and 163, is see in FIG. 8 to have a keyed aperture 137, 141, 145, 155, 159, and 163, respectively. Further, as depicted in FIGS. 9 and 10, there is in vertical alignment with each row of lateral upper connection flanges a row of lateral lower connection flanges, and there is in vertical alignment with each upper retaining ring, a lower retaining ring. A clearer depiction of the vertical alignment of the upper and lower rows of lateral connection flanges and retaining rings on a shaft housing is in FIG. 12 where a vertical plane view of a long shaft housing 15, all shaft housings being similarly constructed, displays the vertical alignment of the row of lateral upper connection flanges 41, 43, 45, with the row of lateral lower connection flanges 239, 241, and 243, respectively; and the vertical alignment of the row of upper retaining rings 221 and 225, with the row of lower retaining rings 239 and 245, respectively.

The structure of the shaft housing, specifically as depicted in FIG. 9, is hollow, providing an interior surface 179 having opposing left and right tongues 175 and 177, respectively, to receive a slideable shaft. Each of the slideable shafts are rectangular in their exterior shape and provide lateral exterior grooves to receive the lateral tongues provided by the interior surfaces of the shaft housings. Thus the shaft housings provide a guide for the insertion of the slideable shafts. Further depicted in FIG. 9, and consonant with the previously mentioned vertical alignments of the upper and lower rows of lateral connection flanges and retaining rings provided by the shaft housings, are the lower connection flanges 189 and 181, each providing keyed apertures 191 and 183, respectively, and the lower retaining rings 193 and 185, each connected to the shaft housing 11 by their retaining ring connectors 195 and 187, respectively.

FIG. 10 depicts the slideable shaft 25 inserted into the long shaft housing 11. Additionally illustrated is the placement of the keyed apertures 75 and 125 in the slideable shaft 25, as well as an indication of the insertability of the two lockable pins 105 and that lockable pin having flange 39. Further illustrated are the grooves 173 and 197 on opposite sides of the slideable shaft 25 which are engaged by tongues on the interior surface of the long shaft housing 11 to guide and position the slideable shaft 25 within the long shaft housing 11. Finally, FIG. 10 illustrates the positioning of an upper row of lateral connection flanges 157 and 161 on one side of the long shaft housing 11 and another upper row of lateral connection flanges/135, 139, and 145 on the other side of the long shaft housing 11. While only lower lateral connection flanges 207 and 211 are depicted in a row on one side of the long shaft housing 11, it is a feature of the preferred embodiment that a lower row of lateral connection flanges will be present on each side of each shaft housing and that the lateral connection flanges in such lower rows of lateral connection flanges will be aligned vertically with the lateral connection flanges in the upper rows of lateral connection flanges provided by a given shaft housing. Also of note in FIG. 10 is that the slot 33 in the top of the long shaft housing 11 is wide enough for the shaft 107 of the lockable pin 105 to pass through, but narrow enough to create a barrier to passage of the spring located on the shaft 107 beneath the flange 35 of the lockable pin 105. This causes the spring to compress when the lockable pin 105 is inserted into the keyed aperture 75 and, once the lockable pin 105 is seated into its locked position, causes a frictional barrier to the sliding of the slideable shaft 25 within the long shaft housing 11.

Figures 6, 7:
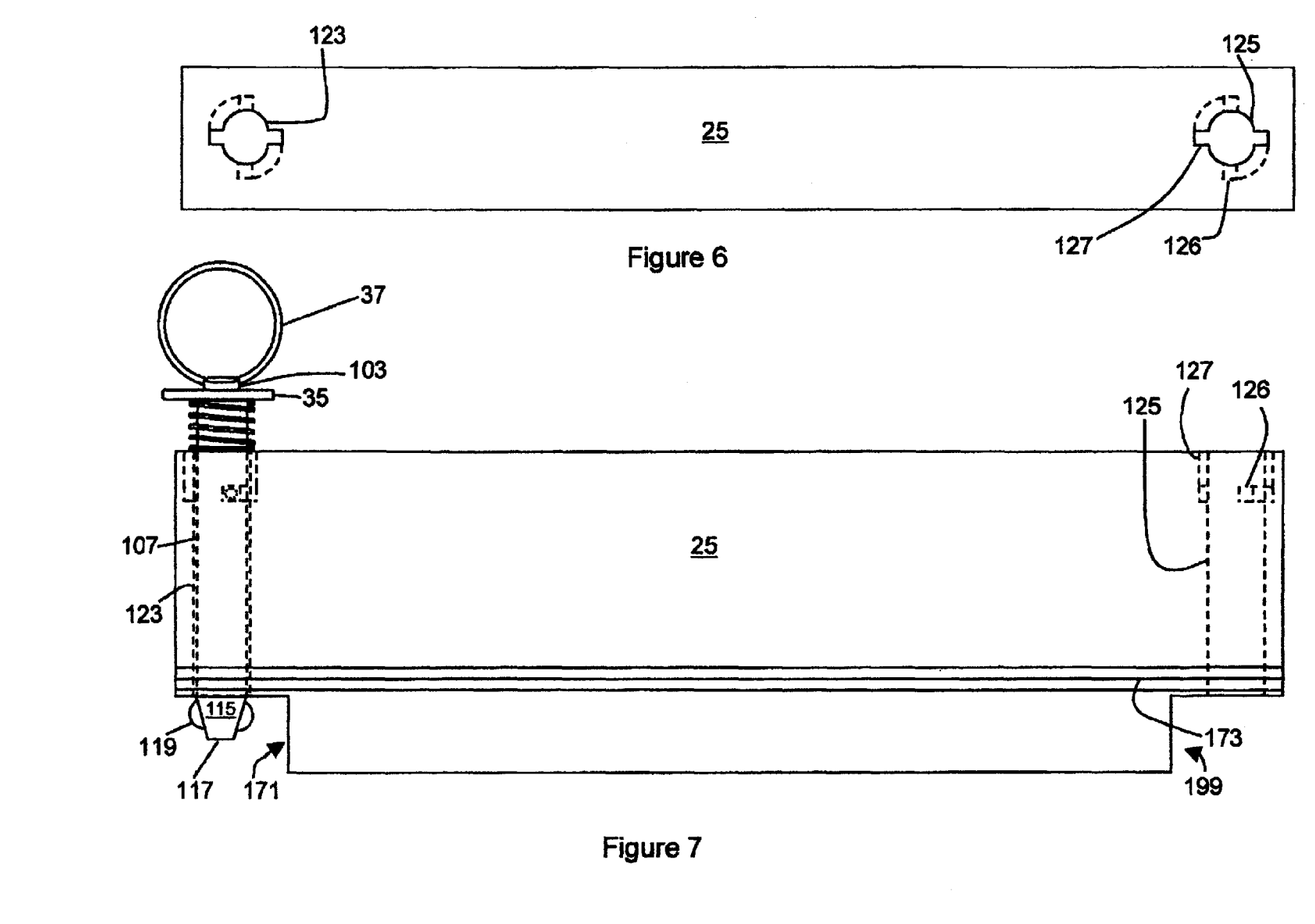
FIG. 6 is a horizontal plane view of the first slideable shaft of the instant invention.
FIG. 7 is a vertical plane view of the first slideable shaft of the instant invention.

The third of the four basic components is the slideable shaft, depicted in detail in FIGS. 6 and 7. As depicted in FIGS. 6 and 7, the detail of slideable shaft 25, all slideable shafts being constructed similarly, indicates the presence of a groove 173 to receive the tongue provided by the interior surface of a shaft housing, the presence of a left inset portion 171 and a right inst portion 199 at the lower ends of the slideable shaft 25, and the presence of a left keyed aperture 123 and a right keyed aperture 125. The keyed apertures 123 and 125 extend vertically through the slideable shaft 25, from the upper surface of the slideable shaft 25 to the inset portions 171 and 199, respectively, of the slideable shaft 25. As called out in FIG. 7, the upper portion of the apertures 123 and 125 each provide a key way 127, together with the appendage locking area 126, into which the lateral appendages on the shaft of a lockable pin, for example shaft 107 of lockable pin 105, can slide and thereby provide a lock.

Figure 5:
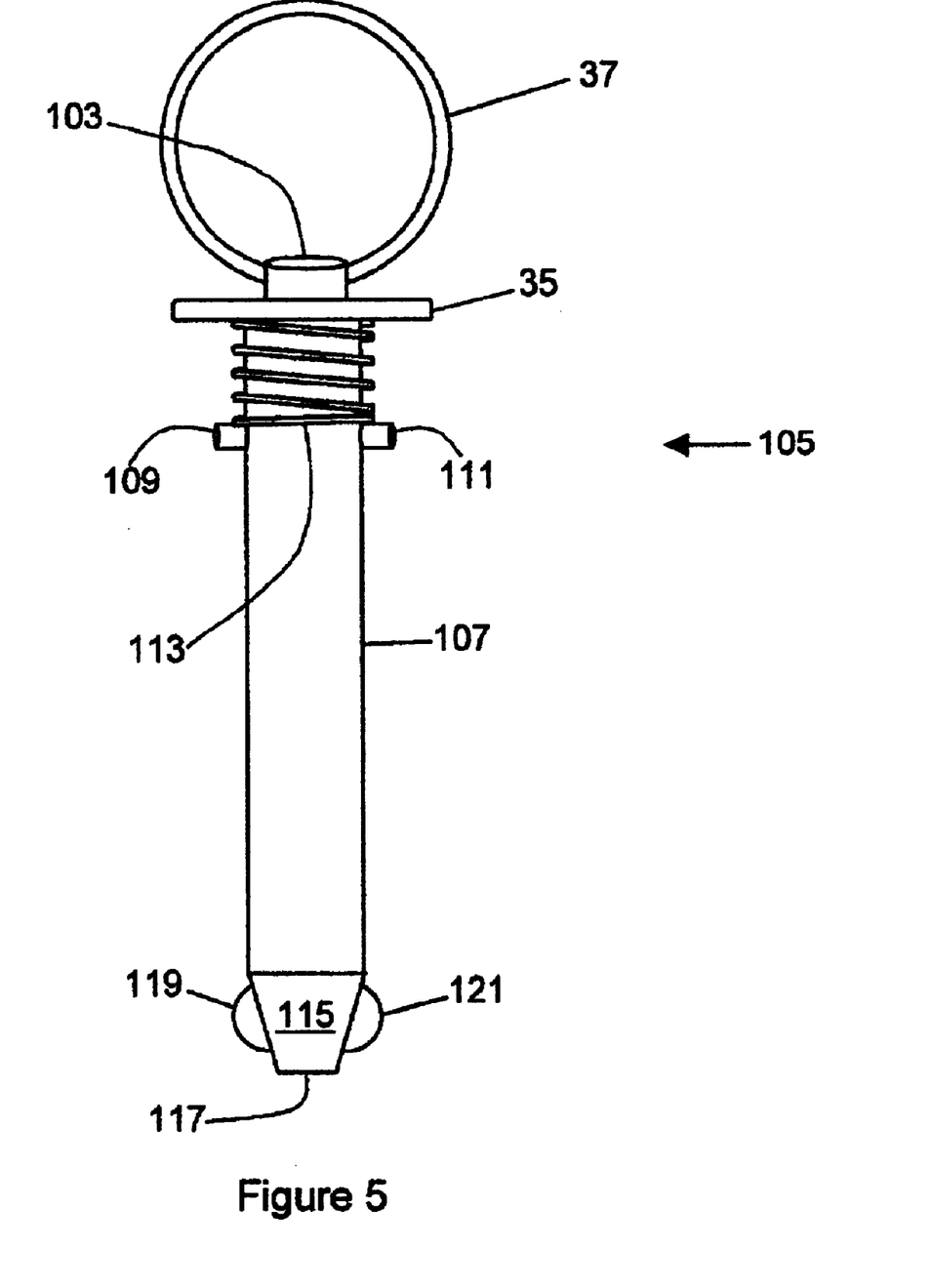
FIG. 5 is a vertical plane view of a lockable pin of the instant invention.

The fourth basic component of the instant invention is the lockable pin. A close examination of the lockable pin 105, all lockable pins in the instant invention being identical, is possible by review of the depiction in FIG. 5. In FIG. 5, the lower portion of the lockable pin 105 is seen to be comprised of a shaft 107, ending in its lower portion in a tapered region 115, with a flat end 117. The upper portion of the lockable pin 105 is seen to provide opposing left and right hand lateral appendages 109 and 111, respectively, with a coiled spring 113 located between the lateral appendages 109 and 111 and the flange 35. The flange 35 separates the shaft 115 of the lockable pin 105 from the head region of the lockable pin 105, and further serves to restrain the coiled spring 113. The head region of the lockable pin 105, in the preferred embodiment, comprises a connector 103 which swiveably connects a ring as a handle 37 to the flange 35. The tapered portion 115 of the shaft 107 has protruding from it two opposing depressible balls 119 and 121. Each of the depressible balls 119 and 121 are forced outwardly from the tapered portion 115 of the shaft 107 by springs (not shown) internal to the shaft 107 whereby the depressible balls 119 and 121 may be forced against such springs into the body of the tapered portion 115 of the shaft 107 and will, in their at rest or natural position extend out of the body of the tapered portion 115 of the shaft 107 past the cylindrical form defining the outer diameter of the shaft 107. Thus the depressible balls 119 and 121 will provide resistance to retraction from a keyed aperture in a slideable shaft into which the lockable pin 105 has been inserted. This presumes, of course, that the keyed aperture has its interior shaft defined by a cylindrical form just slightly greater in diameter than the cylindrical form defining the outer diameter of the shaft 107 and less in diameter than a cylindrical form through which the depressible balls 119 and 121 could pass without being depressed into the body of the tapered portion 115 of the shaft 107. The ring shaped handle 37 of the preferred embodiment provides the advantage of permitting easy insertion of a finger to retract the lockable pin 105 from a keyed aperture into which it has been inserted, and the swiveable connector 103 permits the handle 37 to lie flat against the flange 35 when not in use.

In use the lockable pin 105 must be forced, depressing the depressible balls 119 and 121 into the body of the tapered region 115 of the shaft 107, into the keyed aperture 125 of a slideable shaft 25. The lateral appendages 109 and 111 of the lockable pin 105 must be aligned to coincide with the key way 127 provided by the keyed aperture 125. The coiled spring 113 will as it compresses provide resistance to insertion of the lockable pin 105 into the keyed aperture 125 of a slideable shaft 25, but once the lockable pin 105 is fully inserted a twisting motion will force the movement of the lateral appendages 109 and 111 into a locking area 126 within the shaft of a keyed aperture 125 in a slideable shaft 25. The locking area 126 permits lateral movement of the lateral appendages 109 and 111, and thus of the lockable pin 105, but not vertical movement, thereby acting as a lock retaining the lockable pin 105 within the slideable shaft 25.

Figure 3:
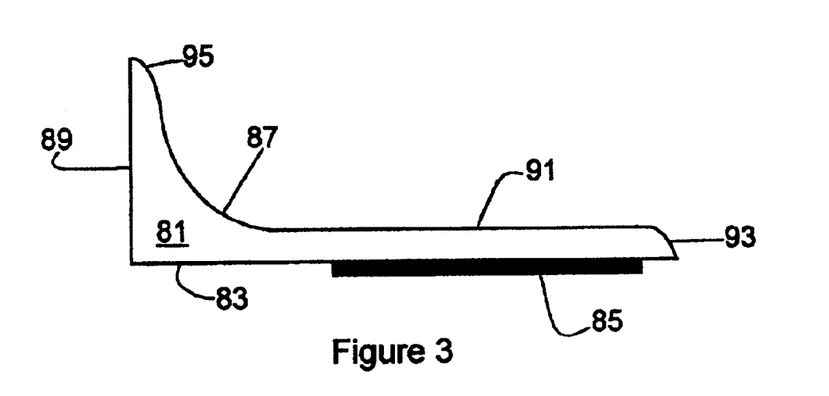
FIG. 3 is a vertical plane view of the horizontal support member.
Figure 4:
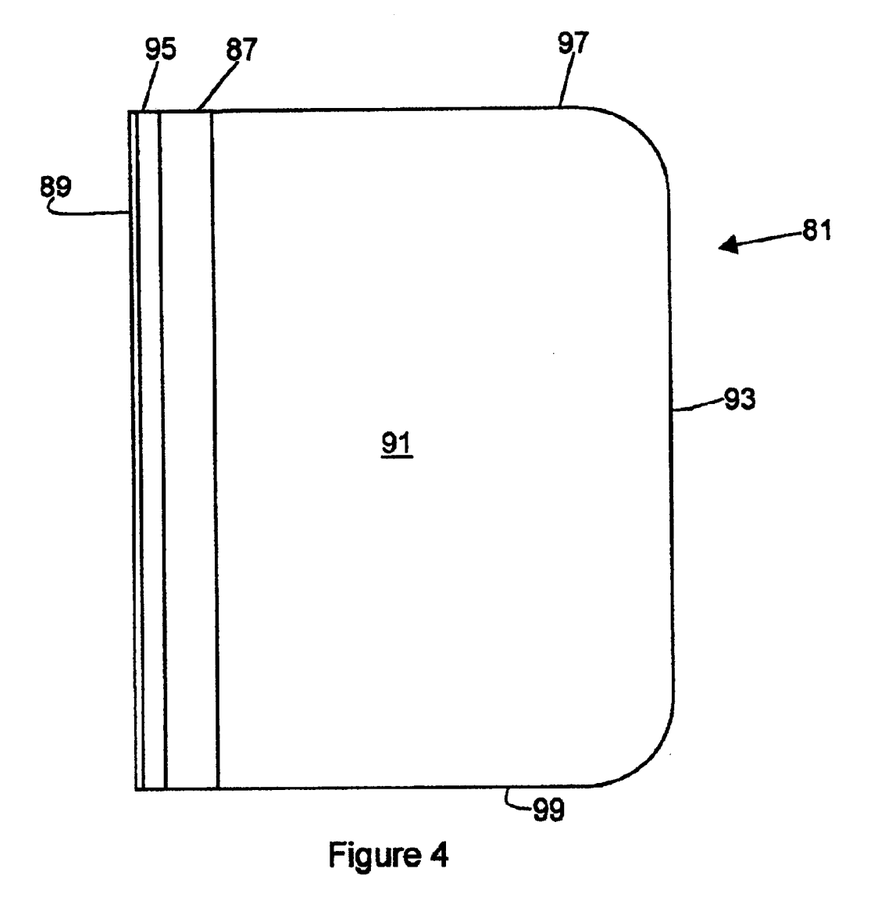
FIG. 4 is a horizontal plane view of the horizontal support member

The preferred embodiment of the instant invention further provides for use of one or more horizontal supports. As all horizontal supports of the instant invention are identical, see for example horizontal support 81, as depicted in FIG. 4. Examination of the horizontal support 81, as depicted in FIGS. 3 and 4, show that the horizontal support 81 is comprised of an elongated horizontal base 91 whose upper surface curves 87 upwardly toward a face supporting top surface 93. The horizontal support 81 further provides a vertical face 89 and a bottom 83 or lower surface to the horizontal base 91. Attached to the bottom 83 of the horizontal base 91 is a section of the hook portion 85 of a loop and hook system to engage the carpet in an automobile trunk which is acting as the loop portion of a loop and hook system. The engagement of the hook portion 85 with the carpet in the automobile trunk area 1 will cause substantial resistance to lateral movement of the horizontal support 81 across the automobile trunk area 1. Also called out in FIG. 4 are the left lateral edge 97 of the horizontal base 91 of horizontal support 81 and the right lateral edge 99 of the horizontal base 91 of horizontal support 81.

Figure 11:
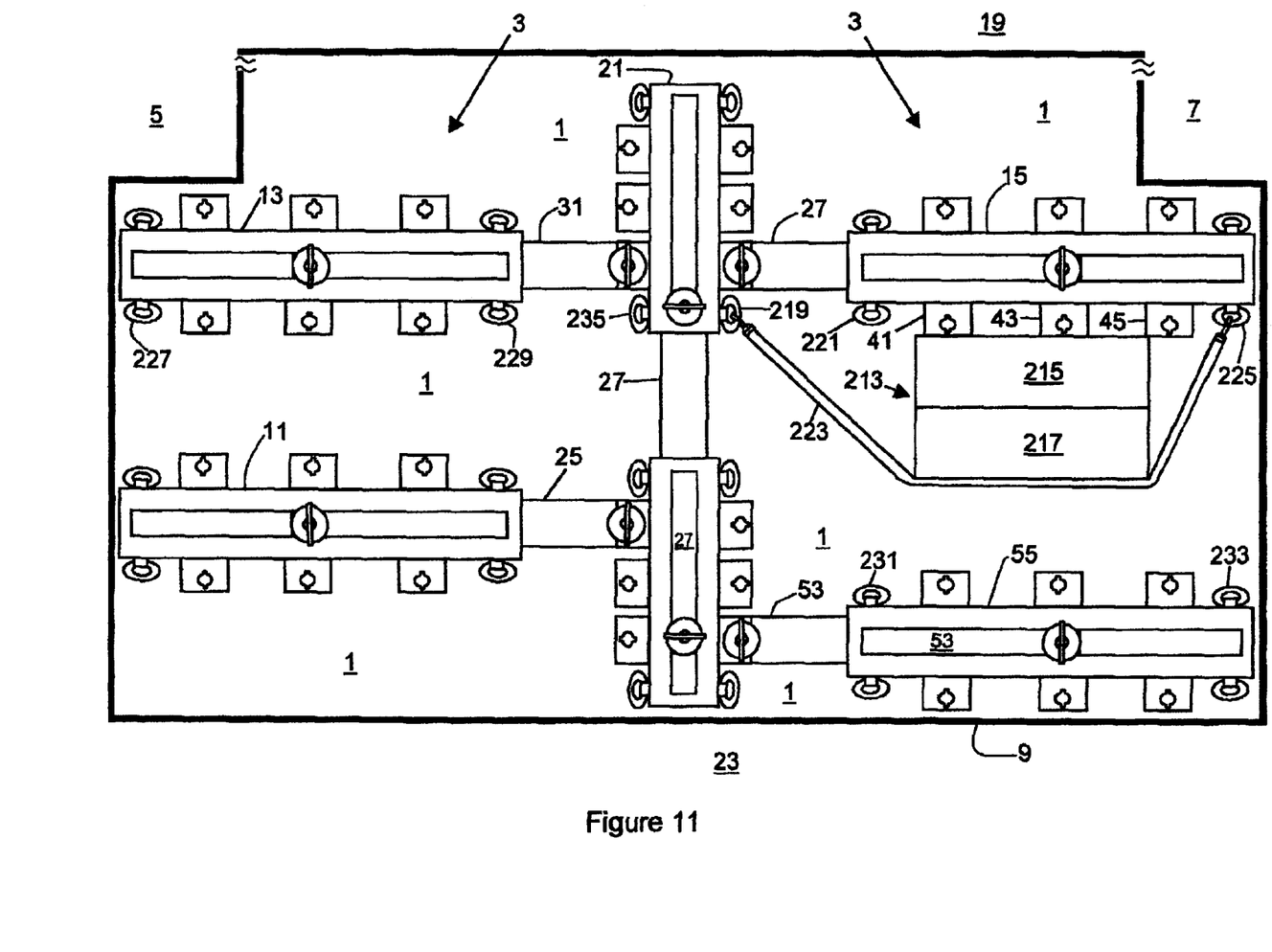
FIG. 11 is a horizontal plane view of the of trunk area of an automobile with the instant invention installed, depicting horizontal deployment of a shaft housing to the left of center, horizontal deployment of a shaft housing to the right of center, and cargo secured to two shaft housings by a cord.
Figure 12:
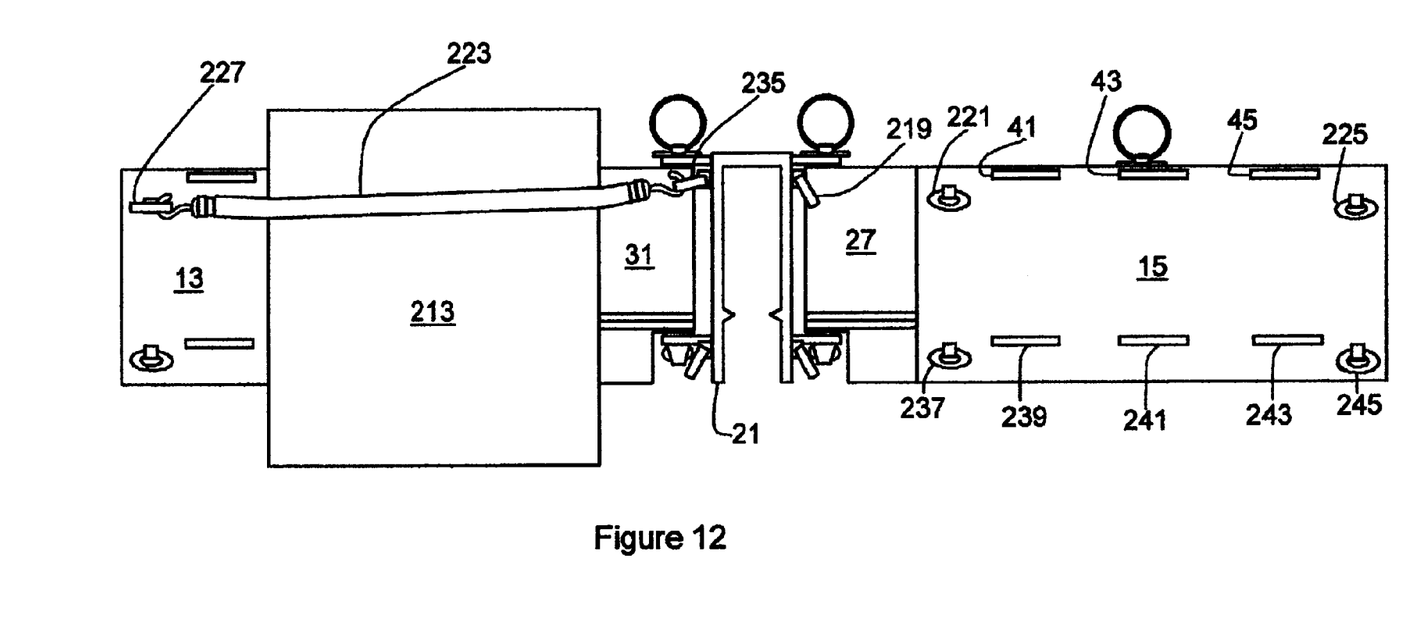
FIG. 12 is a vertical plane view toward the rear of the instant invention taken along line A-A' in FIG. 2, with cargo secured.

Operation of the instant invention can be explained by reference, first, to FIG. 11. In FIG. 11, four long shaft housings 11, 13, 15, and 55 are seen to be connected by lockable pins (not called out) to slideable shafts 25, 31, 27, and 53, respectively. Each of the slideable shafts 25, 31, 27, and 53 are then seen to be connected by lockable pins (not called out) to lateral connection flanges on the short shaft housings 21 and 27. The user's selection of connection points and shaft housing sizes determines the size and shape of the compartments created within the automobile trunk area 1. The configuration depicted in FIG. 11 produces five compartments within the automobile trunk area 1. Also depicted in FIG. 11 are two items of cargo 215 and 217 within one of the compartments. The two items of cargo 215 and 217, which are jointly referred to as the cargo 213, are held in position within the particular compartment bounded by long shaft housing 55, slideable shaft 53, short shaft housing 17, slideable shaft 28, short shaft housing 21, slideable shaft 27, long shaft housing 15, and the periphery 9 of the automobile trunk area 1. The cargo 213 is seen to be secured within the particular compartment, bounded as above-described, by a cord 223 connected at one end to the retaining ring 219 on the short shaft housing 21 and at the other end to the retaining ring 225 on the long shaft housing 15. Numerous potential connections of the cord 223 are possible to accommodate cargo 213 of various sizes and shapes. Another possible configuration of cord 223 connection is depicted in FIG. 12 which shows the cord 223 connected on one end to retaining rings 227 on the long shaft housing 13 and on the other end to retaining ring 235 on the short shaft housing 21. While the depictions in FIG. 11 and in FIG. 12 are of connections of the cord 223 to upper retaining rings, such connection could as well have been elected by the user to be to any lower retaining ring, or to any combination of upper and lower retaining rings as dictated by the size and shape of the cargo 213. Additionally, the cargo 213 could be secured in place by more than one cord 223, each of which is connected on one end to either an upper or lower retaining ring and is connected on the other end to either an upper or lower retaining ring. A wide variety of possible combinations aids the user in selecting the cord 223 connections best suited to secure the cargo 213 within the compartment created by the assembly of shaft housings and slideable shafts.

Figure 13:
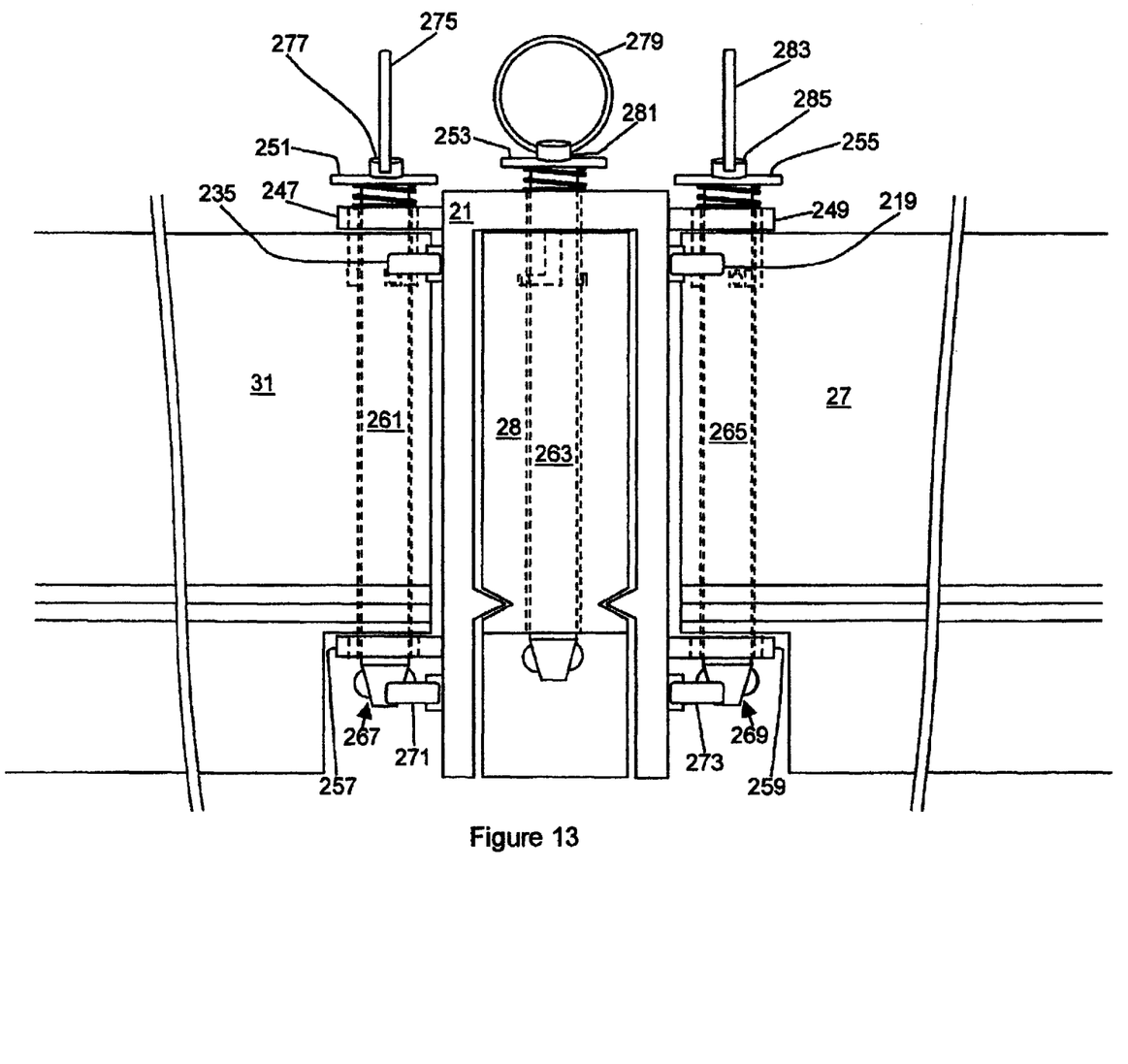
FIG. 13 is a second vertical plane view toward the rear of the instant invention taken along line A-A' in FIG. 2.

FIG. 13 depicts the connection of slideable shafts 31 and 27 to the short shaft housing 21. FIG. 13 illustrates the use of both upper lateral connection flange 247 and lower connection flange 257 by a lockable pin (not called out) having shaft 261. The head of the lockable pin having shaft 261 is seen to comprise the handle 275, the connection 277, and the flange 251. The spring, lateral appendages, and tapered end of the lockable pin having shaft 261 are depicted but not called out in FIG. 13. Insertion of the lockable pin having shaft 261 is accomplished by first aligning slideable shaft 31 such that its keyed aperture is vertically aligned with both the upper lateral connection flange 247 and lower connection flange 257 connected to the short shaft housing 21. Then, the lockable pin having shaft 261 is pushed, by grasping the handle 275, down into first the keyed aperture of the upper lateral flange 247, causing the depression of the depressible balls 267 and 271 to fit within the circumference of the keyed aperture, second continuing to push the lockable pin having shaft 261 down into the keyed aperture of the slideable shaft 31, third continuing to push the lockable pin down into and through the lower lateral aperture 257 to the point where the lateral appendages of the lockable pin bottom in the key way of the keyed aperture of the keyed aperture provided by slideable shaft 31 (see FIGS. 6 and 7 for detail of the structure of a keyed aperture provided by a slideable shaft), and fourth turning the handle 275 to lock or set the lockable pin's lateral appendages within the keyed aperture of the slideable shaft, simultaneously with the pushing of the lockable pin down to the seating or locking point within the keyed aperture of the slideable shaft the tapered end of the lockable pin will push through the keyed aperture provided by the lower connection flange 257 with resistance caused by the depression of the depressible balls 257 and 271. In like fashion FIG. 13 also depicts two other seated or locked lockable pins, that lockable pin having shaft 263 and that lockable pin having shaft 265. The insertion process for the lockable pin having shaft 265 through the slideable shaft 27 is similar to that just described for insertion of the lockable pin having shaft 261. The insertion process for the lockable pin having shaft 263 is accomplished by first aligning sliding slideable shaft 28 into the end opening of short shaft housing 21. Then, the lockable pin having shaft 263 is pushed, by grasping the handle 279, down through the slot in the top of the short shaft housing 21, depressing the depressible balls at the end of shaft 263, and continuing to push the lockable pin having shaft 263 downward into the keyed aperture of the slideable shaft 28, third continuing to push the lockable pin down into and through the slideable shaft 28 to the point where the lateral appendages of the lockable pin bottom in the key way of the keyed aperture provided by slideable shaft 28 (see FIGS. 6 and 7 for detail of the structure of a keyed aperture provided by a slideable shaft), and fourth turning the handle 279 to lock or set the lockable pin's lateral appendages within the keyed aperture of the slideable shaft 28, simultaneously with the pushing of the lockable pin down to the seating or locking point within the keyed aperture of the slideable shaft 28 the tapered end of the lockable pin will push through the keyed aperture provided by the slideable shaft 28, into its inset area (see FIG. 7 for the call out of two inset areas 171 and 199 provided by a slideable shaft) with resistance caused by the depression of the depressible balls at the end of the shaft 263. Retraction of a lockable pin is accomplished by turning the lockable pin to place the lockable pin's lateral appendages into the key way of the shaft within which the lockable pin is seated, then pulling the lockable pin's handle up, overcoming the resistance provided by the lockable pin's depressible balls, until the lockable pin is free.

The instant invention provides several advantages to commerce. In the preferred embodiment, the structure and operation of all shaft housings (save and except the feature of length herein designated as either long or short) is the same, the structure and operation of all slideable shafts is the same, and the structure and operation of all lockable pins is the same. Thus a substantial degree of uniformity and modularity in system components is achieved. This naturally results in a cost savings in manufacture.

Again, by reference to FIG. 2, the flexibility of the preferred embodiment in the formation of angularly shaped compartments, such as that formed by the periphery 9 of the automobile trunk area 1, the small portion of the short shaft housing 17, the slideable shaft 53, and the long shaft housing 55, is desirable and not available in competing systems.

Further, the ease of construction of compartments within an automobile trunk area 1 with the apparatus of the instant invention is manifest, simple insertion of lockable pins connects shaft housings to slideable shafts and connects slideable shafts to lateral connection flanges on other shaft housings. Four examples of this repetitive pattern of connection are depicted in FIG. 2. As seen in FIG. 2, long shaft housing 11 is connected by the lockable pin having flange 37 to the slideable shaft 25, the slideable shaft 25 is connected by the lockable pin having flange 39 to the lateral connection flange 57 provided by short shaft housing 17. Likewise, long shaft housing 55 is connected to slideable shaft 53, slideable shaft 53 is connected to lateral connection flange 51; long shaft housing 13 is connected to slideable shaft 31, slideable shaft 31 is connected to lateral connection flange 247; and long shaft housing 15 is connected to slideable shaft 27, slideable shaft 27 is connected to lateral connection flange 249. One instance of the connection of two short shaft housings 17 and 21 by insertion of opposite ends of the slideable shaft 28 is depicted in FIG. 2, and again, lockable pins serve to frictionally hold the slideable shaft 28 in place within the short shaft housings 17 and 21. Finally, the use of horizontal supports having horizontal surfaces 91 and 101 are depicted in FIG. 2. Use and placement of the horizontal supports is wholly optional, provide additional lateral support to the shaft housings where they are placed, and provide greater usability and flexibility to the user of the instant invention.

While the preferred embodiments of the instant invention have been described in substantial detail and fully and completely hereinabove, it will be apparent to one skilled in the art that numerous variations of the instant invention may be made without departing from the spirit and scope of the instant invention, and accordingly the instant invention is to be limited only by the following claims.

I claim:

1. An apparatus to provide compartments of variable size and shape within an automobile trunk comprising:
    a plurality of shaft housings,
    a plurality of slideable shafts, and
    a plurality of lockable pins;
wherein
    said plurality of shaft housing are located within said automobile trunk,
    said plurality of slideable shafts are located within said automobile trunk,
    said plurality of lockable pins are located within said automobile trunk,
    said slideable shafts provide keyed apertures for the insertion of said lockable pins,
    said shaft housings slideably receive said slideable shafts,
    said lockable pins are slideably insertable into said keyed apertures in said slideable shafts,
    said lockable pins provide springs which compel frictional engagement between said slideable shafts and said shaft housings when said lockable pins are slideably inserted into said keyed apertures in said slideable shafts,
    each of said shaft housings provide a plurality of lateral connection flanges,
    each of said lateral connection flanges provides a keyed aperture,
    said lockable pins are slideably insertable into said keyed aperture in said lateral connection flange,
    any one of said slideable shafts is connectable to any one of said plurality of lateral connection flanges by slideable insertion of one of said lockable pins through both said keyed aperture in said one of said slideable shafts and said keyed aperture in said one of said plurality of said lateral connection flanges, and
    any two of said shaft housings are connectable to one another by slideably inserting opposite ends of one of said slideable shafts into each of said two of said shaft housings and then slideably inserting said lockable pins in said keyed aperture in each of said opposite ends.

2. The invention of claim 1 wherein said shaft housings are of two lengths only.

3. The invention of claim 1 additionally comprising horizontal supports wherein said horizontal supports provide a lower surface covered with the hook portion of a hook and loop system to interact with the carpet of said automobile trunk, and said horizontal supports are locatable by the user adjacent any of said sideable shafts and said shaft housings.

4. The invention of claim 1 wherein said lockable key comprises:

a handle, a flange, a shaft, a first spring, a second spring, and two depressible balls, wherein said handle is connected to the top of said flange, said shaft is connected to the bottom of said flange, said shaft provides two lateral appendages, said first spring is coiled around said shaft between said flange and said two lateral appendages, said shaft terminates in a tapered region, said tapered region provides apertures through which said depressible balls depend, and said second spring is mounted internal to said shaft and acts to push said depressible balls outwardly through said apertures.

* * * * *